(12) United States Patent
Vaterlaus et al.

(10) Patent No.: US 9,749,301 B2
(45) Date of Patent: Aug. 29, 2017

(54) CRYPTOGRAPHIC WEB SERVICE

(71) Applicant: Voltage Security, Inc., Cupertino, CA (US)

(72) Inventors: Robert K. Vaterlaus, Oakland, CA (US); Matthew J. Pauker, San Francisco, CA (US); Guido Appenzeller, Menlo Park, CA (US)

(73) Assignee: Voltage Security, Inc., Cupertino, CA (US)

( * ) Notice: Subject to any disclaimer, the term of this patent is extended or adjusted under 35 U.S.C. 154(b) by 0 days.

(21) Appl. No.: 14/846,649

(22) Filed: Sep. 4, 2015

(65) Prior Publication Data

US 2015/0381585 A1    Dec. 31, 2015

Related U.S. Application Data

(63) Continuation of application No. 12/014,681, filed on Jan. 15, 2008, now abandoned.

(60) Provisional application No. 60/885,458, filed on Jan. 18, 2007.

(51) Int. Cl.
*H04L 9/32* (2006.01)
*H04L 29/06* (2006.01)
*H04L 29/08* (2006.01)

(52) U.S. Cl.
CPC ...... *H04L 63/0428* (2013.01); *H04L 63/0485* (2013.01); *H04L 63/061* (2013.01); *H04L 67/16* (2013.01); *H04L 63/0435* (2013.01); *H04L 63/08* (2013.01)

(58) Field of Classification Search
CPC ............ H04L 63/0428; H04L 63/0485; H04L 63/061; H04L 67/16
See application file for complete search history.

(56) References Cited

U.S. PATENT DOCUMENTS

| | | | |
|---|---|---|---|
| 6,335,972 B1 | 1/2002 | Chandersekaran et al. |
| 6,980,993 B2 | 12/2005 | Horvitz et al. |
| 7,072,807 B2 | 7/2006 | Brown et al. |
| 7,117,366 B2 | 10/2006 | Vincent |
| 7,200,530 B2 | 4/2007 | Brown et al. |
| 7,529,793 B2 | 5/2009 | Itoh et al. |
| 7,603,469 B2 | 10/2009 | Fletcher et al. |

(Continued)

FOREIGN PATENT DOCUMENTS

EP    1540628    1/2004

*Primary Examiner* — Techane Gergiso
(74) *Attorney, Agent, or Firm* — Treyz Law Group, P.C.; Michael H. Lyons; David K. Cole (57) ABSTRACT

A system that supports cryptographic web services is provided. A program running on program computing equipment may call a local cryptographic function. A web services interface such as a simple object access protocol interface on the program computing equipment makes a corresponding remote cryptographic function call to a web services interface such as a simple object access protocol interface at a cryptographic web service over a communications network such as the internet. At the cryptographic web service, a cryptographic engine implements cryptographic operations such as encryption and decryption operations. After successful authentication of the calling program, the cryptographic engine produces results for the remotely cryptographic function and returns the results to the program over the communications network.

9 Claims, 9 Drawing Sheets

(56) References Cited

U.S. PATENT DOCUMENTS

| | | |
|---|---|---|
| 7,685,414 B1 | 3/2010 | Appenzeller et al. |
| 2003/0110373 A1 | 6/2003 | Champion |
| 2004/0172555 A1 | 9/2004 | Beringer et al. |
| 2005/0013437 A1 | 1/2005 | Ikonen et al. |
| 2005/0021799 A1 | 1/2005 | Imamura et al. |
| 2005/0044197 A1* | 2/2005 | Lai .................. G06Q 10/10 709/223 |
| 2005/0065879 A1 | 3/2005 | Birch et al. |
| 2005/0071632 A1* | 3/2005 | Pauker ............. H04L 63/0442 713/165 |
| 2005/0081039 A1 | 4/2005 | Lee et al. |
| 2005/0086298 A1* | 4/2005 | Campbell ............ G06Q 40/00 709/203 |
| 2005/0144457 A1 | 6/2005 | Lee et al. |
| 2005/0160098 A1 | 7/2005 | Campbell et al. |
| 2005/0228998 A1 | 10/2005 | Chan et al. |
| 2005/0273616 A1 | 12/2005 | Nishio et al. |
| 2006/0031930 A1 | 2/2006 | Patrick et al. |
| 2006/0036754 A1 | 2/2006 | Itoh et al. |
| 2006/0080257 A1 | 4/2006 | Vaughan et al. |
| 2006/0080419 A1* | 4/2006 | Patrick .................. H04L 41/082 709/220 |
| 2006/0149962 A1* | 7/2006 | Fountain ............ H04L 63/0428 713/151 |
| 2006/0165233 A1 | 7/2006 | Nonaka et al. |
| 2006/0206932 A1* | 9/2006 | Chong ............... H04L 63/0807 726/10 |
| 2006/0233180 A1 | 10/2006 | Serghi et al. |
| 2007/0022164 A1 | 1/2007 | Nog et al. |
| 2007/0156872 A1* | 7/2007 | Stoyanova .......... G06F 17/3089 709/223 |
| 2007/0245409 A1 | 10/2007 | Harris et al. |

* cited by examiner

| PROGRAM 1 | ENCRYPT; FULL DECRYPT |
| --- | --- |
| PROGRAM 2 | PARTIAL DECRYPT |
| PROGRAM 3 | FULL DECRYPT |
| ⋮ | ⋮ |

CRYPTOGRAPHIC WEB SERVICE

This application is a continuation of patent application Ser. No. 12/014,681, filed Jan. 15, 2008, which claims the benefit of provisional patent application No. 60/885,458, filed Jan. 18, 2007, both of which are hereby incorporated by reference herein in their entireties. This application claims the benefit of and claims priority to patent application Ser. No. 12/014,681, filed Jan. 15, 2008, and provisional patent application No. 60/885,458, filed Jan. 18, 2007.

BACKGROUND OF THE INVENTION

This invention relates to cryptography and more particularly, to cryptographic web services in which cryptographic functions are provided remotely over a network.

Cryptographic services are used in a variety of contexts, including database management, electronic commerce, and communications. Typical cryptographic services include encryption and decryption.

In some situations, it may be desirable to deploy a cryptographic service remotely. Remotely implemented cryptographic services may be shared among multiple computer programs and users.

With conventional remote programming arrangements, custom software is written on both local and remote computers. The remote software in this type of situation is written to perform a particular set of operations for the local software and does not have a generalized application program interface (API) that would allow the remote software to be invoked by other local software. When there are numerous different local computing environments to support, it can be difficult or impossible to implement the required local software efficiently. For example, the local software may not compile properly on certain platforms. Operating system and programming language incompatibilities may also cause problems. Moreover, maintaining a system with appropriate software updates can be challenging when supporting multiple platforms. These issues can significantly limit the deployment potential for conventional cryptographic services.

It would therefore be desirable to be able to provide cryptographic services remotely.

SUMMARY OF THE INVENTION

In accordance with the present invention, a cryptographic web service is provided that may be remotely accessed over a communications network such as the internet.

A program running on program computing equipment may make a local cryptographic function call. The program provides parameters for the local function call, such as data that is to be operated on and a cryptographic key. The parameters are encoded by a simple object access protocol interface on the program computing equipment.

The simple object access protocol interface at the program computing equipment makes a remote cryptographic function call that corresponds to the locally-called function. In making the remote function call, the simple object access protocol interface at the program computing equipment sends the encoded parameters to a simple object access protocol interface at the cryptographic web service. The simple object access protocol interface at the cryptographic web service decodes the encoded parameters and calls the remote cryptographic function using a cryptographic engine at the cryptographic web service. The cryptographic engine may be used to implement cryptographic operations such as encryption, decryption, signature verification, etc.

The cryptographic web service may authenticate the program. If desired, authentication credentials for the program may be provided as part of the transport protocol that is used in communicating between the simple object access protocol interfaces at the program computing equipment and the cryptographic web service. Other types of authentication credentials (e.g., a loginID and password) may also be uploaded to the cryptographic web service. The uploaded credentials or a set of associated credentials may be used in requesting a cryptographic key from a key server. External authentication of the program's authentication credentials may be performed using an authentication server. Following authentication, results from running the remote cryptographic function can be transmitted from the simple object access protocol interface at the cryptographic web service to the simple object access protocol interface at the program computing equipment over the internet and can be received by the program.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
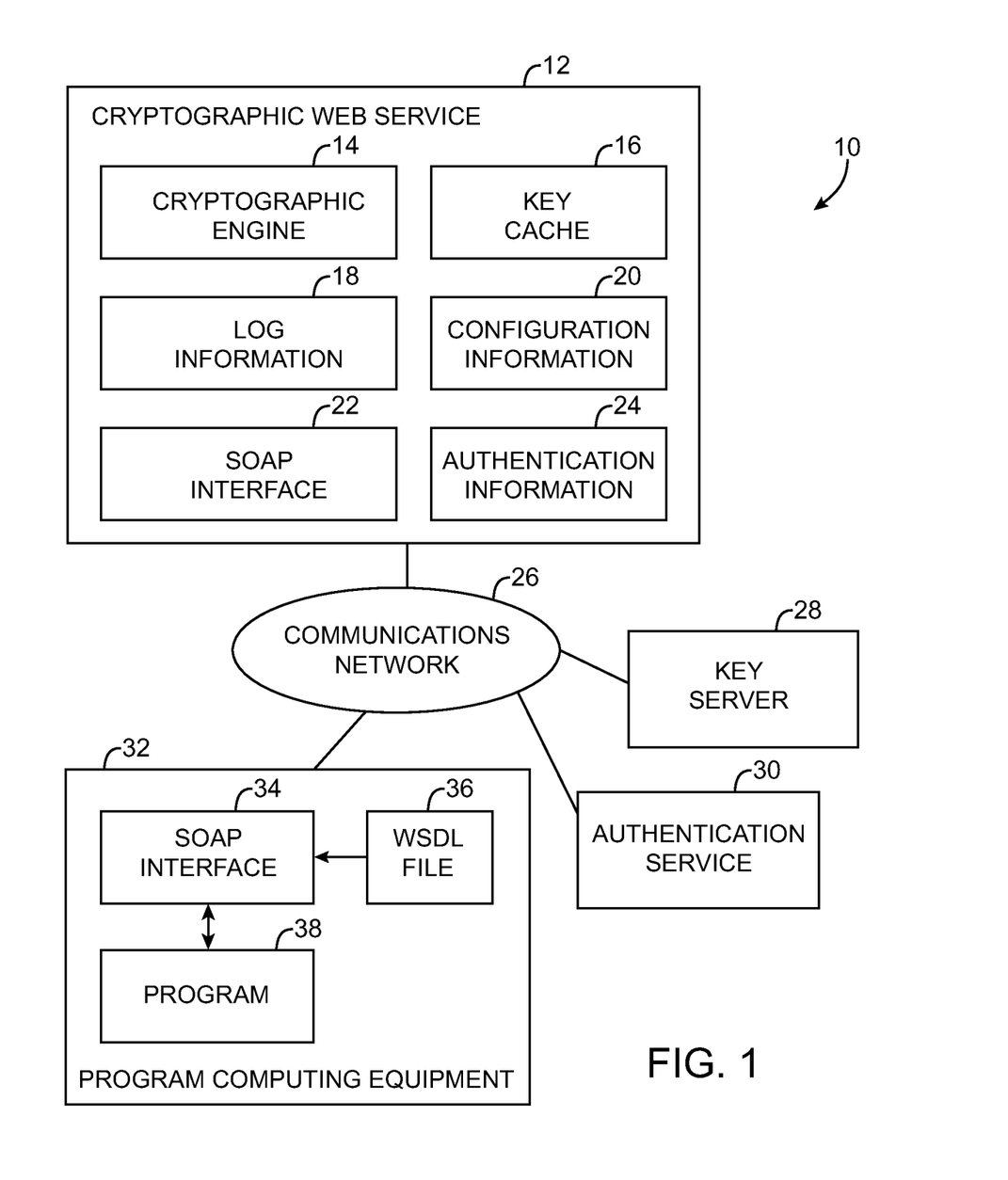
FIG. 1 is a diagram of an illustrative system environment including a cryptographic web service that is used remotely by a computer program in accordance with the present invention.

An illustrative cryptographic system 10 in accordance with the present invention is shown in FIG. 1. System 10 includes computing equipment 32 and communications network 26. The computing equipment 32 may include one or more personal computers, workstations, computers configured as servers, mainframe computers, portable computers, etc. Computing equipment 32 may be provided at a single location or at multiple locations that are linked by a network. The communications network 26 may include a local area network, a wide area network such as the internet, any other suitable network, or a combination of such networks.

Systems such as system 10 may be used in processing data for one or more organizations. In the example of FIG. 1, a program 38 is implemented on computing equipment 32. In a typical situation, program 38 is run on computing equipment 32 by a user such as an individual or an organization that is associated with computing equipment 32. Because program 38 is implemented on computing equipment 32, computing equipment 32 is sometimes referred to as program computing equipment. Other computing equipment (e.g., other personal computers, workstations, computers configured as servers, mainframe computers, portable computers, and networked combinations of such computing equipment) may be used to support the operations of cryptographic web service 12, key server 28, and authentication service 30.

With one suitable scenario, cryptographic web service 12, key server 28, and authentication service 30 are each implemented on a separate hardware platform. This is, however, merely illustrative. Service 12, server 28, and server 30 may be implemented using any suitable number of hardware platforms. For example, service 12, server 28, and service 30 may be implemented on a single computer or on a cluster of closely-related computers.

A cryptographic engine 14 may be implemented at cryptographic web service 12. The nature of the cryptographic web engine 14 depends on the type of cryptographic capabilities that are offered by cryptographic web service 14. In general, cryptographic engine 14 may be used to support any suitable cryptographic functions such as encryption, decryption, creating and verifying digital signatures, authentication operations, etc. With one suitable arrangement, cryptographic engine 14 includes an encryption engine and a decryption engine. In this type of situation, plaintext can be encrypted into ciphertext using the encryption engine and ciphertext can be decrypted into plaintext using the decryption engine.

Cryptographic engine 14 may be based on any suitable cryptographic algorithms. Suitable cryptographic algorithms for engine 14 include algorithms for supporting public-key cryptography such as identity-based encryption (IBE) and public-key-infrastructure (PKI) cryptography. PKI cryptography generally relies on public-private key cryptographic algorithms and is sometimes referred to as public-private key cryptography (PKC). If desired, engine 14 may support symmetric key encryption and decryption functions. In some situations, web service 12 or other services in system 10 may interface with additional services. For example, when implementing identity-based encryption, cryptographic engine 14 or other software in system 10 may communicate with a server to obtain IBE public parameter information. The IBE public parameter information may be used to support cryptographic operations in an IBE-based algorithm such as an IBE-based cryptographic engine 14.

The operations performed by cryptographic engine 14 are often referred to as functions. Because these functions are invoked remotely over network 26, the functions performed by cryptographic engine 14 may sometimes be referred to as remote functions. These functions may also sometimes be referred to as remote operations, remote methods, or remote procedures.

Because cryptographic web service 12 is implemented remotely, the computing equipment for service 12 may be provided with robust resources (e.g., substantial amounts of processing power, memory, library resources, etc.). These resources may allow cryptographic web service 12 to handle cryptographic operations that would be difficult to handle with the potentially more limited resources available on local computing platforms such as program computing equipment 32 of FIG. 1.

Program 38 may be any suitable computer program or process. As one example, program 38 may be electronic commerce software that encrypts a credit card number before the credit card number is stored in a database. In this type of situation, program 38 may access cryptographic web service 12 remotely over the internet or other communications network 26 to encrypt and decrypt the credit card numbers. As another example, program 38 may be a bank statement generation program that generates encrypted email statements for the customers associated with a bank. Operations involved in encrypting and decrypting the bank statement may be performed by accessing cryptographic web service 12. If desired, different instances of program 38 or different programs may use cryptographic engine 14. For example, a bank statement generation program at a bank may call cryptographic engine 14 remotely over network 26 to perform statement encryption operations. Later, a customer of the bank who has received an encrypted statement may access cryptographic engine 14 over network 26 to perform decryption operations. Alternatively, a bank customer may use a locally-implemented decryption engine (as an example).

When authorized, key server 28 may be used to provide cryptographic keys to cryptographic web service 12 and other parties. The type of cryptographic key that is provided by key server 28 depends on the type of cryptographic algorithm being implemented by cryptographic engine 14. For example, if cryptographic engine 14 is being used to implement an IBE cryptographic scheme, key server 28 may be used to provide IBE private keys. If cryptographic engine 14 is being used to implement a PKC algorithm (e.g., the RSA cryptographic algorithm), key server 28 may be used to provide PKC private keys to cryptographic engine 14. Key server 28 may also provide cryptographic engine 14 with symmetric keys when a symmetric key cryptographic algorithm is being used. Key server 28 may be implemented on a stand-alone server or may be implemented on the same hardware platform as cryptographic web service 12 (as examples). Key server 28 may store keys (e.g., in a database at key server 28) or may generate keys in real time (e.g., using an identity-based-encryption key generation algorithm).

Authentication service 30 may be used to verify authentication credentials as part of a key request or other cryptographic operation. Authentication credentials may be, as an example, an identifier (ID) and password that are associated with a particular program 38, biometric credentials, etc. If desired, authentication credentials may be provided in the form of an assertion. For example, credentials may be provided in the form of an assertion that a program obtains from an authentication service such as a Kerberos Server or secure assertion markup language (SAML) server. Authentication service 30 may be implemented on a stand-alone server or may be implemented on the same hardware platform as cryptographic web service 12 (as examples).

Cryptographic web service 12 may have a key cache 16. Key cache 16 may be used to cache cryptographic keys. As an example, key cache 16 may be used to cache symmetric or private keys that have been retrieved from key server 28. Use of key cache 16 may help to reduce the amount of time required to service a cryptographic function request, because operations that would otherwise be needed to request and obtain a desired key from key server 28 can be avoided. Performance optimization techniques such as key caching techniques are optional and need not be used.

Cryptographic web service 12 may also store information such as configuration information 20, authentication information 24, and log information 18.

Log information 18 may include information on various operations performed by cryptographic web service 12 (i.e., successful receipt of uploaded data from program 38, successful authentication, failed authentication, successful encryption, successful decryption, encryption or decryption failures, errors that arise during other processing steps, etc.).

Configuration information 20 may include policy information such as rules that dictate which key server cryptographic engine 14 is to use when obtaining encryption information such as IBE public parameters. Configuration information 20 may also include information that defines which cryptographic algorithm is used by cryptographic engine 14 (e.g., AES or triple DES) or which key strength is to be used (e.g., AES-128 or 256-bit AES). If desired, configuration information 20 may include information on which types of credentials are required from program 38 during authentication. By maintaining policy information at cryptographic web service 12, policy decisions that might otherwise be made a local program can be offloaded to service 12. These are merely illustrative examples. Configuration information 20 may include any suitable information for adjusting the settings of cryptographic engine 14 and cryptographic web service 12.

Authentication information 24 may be used when cryptographic web service 12 requests a key from key server 28.

When calling a function, program 38 may provide cryptographic web service 12 with authentication credentials by uploading suitable authentication credentials over communications network 26. Some types of authentication credentials (e.g., ID and password) that are part of a function call can be received from program 38 by service 12 and retransmitted to key server 28. Key server 28 can then provide the authentication credentials to authentication service 30 to determine whether the key request should be granted.

However, with some methods of authentication, such as client certificate authentication performed as part of a secure sockets layer handshake, authentication credentials cannot be forwarded. When these authentication methods are used, web service 12 may have authentication information 24 that specifies how authentication credentials of program 38 that have been verified successfully are to be mapped into different authentication credentials that are then used with key server 28. For example, the authentication credentials can be mapped into an appropriate shared secret that is shared between service 12 and server 28. Mapping information of this type is an example of authentication information 24 that can be maintained at cryptographic web service 12. An advantage of maintaining mapping authentication information at service 12 is that this type of arrangement allows service 12 to authenticate many programs with different credentials, while using one or relatively few shared secrets or other mapped authentication credentials between the cryptographic web service 12 and the key server 28.

Cryptographic web service 12 and program computing equipment 32 have respective web services interfaces 22 and 34. Web services are services that support interoperable machine-to-machine interaction over a network (e.g., the internet). In general, web service interfaces 22 and 34 may use any suitable web services protocols. The web services protocols provide a standard interface between program 38 and cryptographic engine 14, regardless of which computer languages have been used to implement program 38 and engine 14, and support function calls made over a network. Use of a standard interface (sometimes referred to as application programming interface or API) allows the cryptographic web service to be called from a program in any programming language as a function call.

Depending on the way in which cryptographic web service 12 is implemented, service 12 may conform to different sets of web services protocols. With one suitable arrangement, which is described herein as an example, cryptographic web service 12 and program computing equipment 32 communicate through interfaces 22 and 34 that use a protocol that is sometimes referred to as SOAP (simple object access protocol or service-oriented access protocol). At program computing equipment 32, SOAP interface 34 is used in making a function call from program 38 to web service 12 over network 26 and is used in receiving the results of that function call from service 12 over network 26. At web service 12, SOAP interface 22 receives function calls from program 38 and, after obtaining corresponding results from cryptographic engine 14, provides the results of the function calls to program 38. SOAP interfaces such as interfaces 22 and 34 may be provided using any suitable arrangement. As an example, SOAP interfaces 22 and 34 may be provided as part of the .NET framework available from Microsoft Corporation of Redmond, Wash.

The use of interfaces that are compliant with the SOAP web services protocol is an example. Any suitable web services protocol(s) may be used for system 10 that provides a standard interface between programs that are potentially written in different languages and that supports remote procedure calls over the internet or other communications networks.

The capabilities of the cryptographic web service 12 may be defined using a description file or other suitable technique. For example, one or more files that contain service descriptions may be electronically published in a registry or otherwise made available to program 38. With one suitable arrangement, program 38 is provided with a file 36 that is written in Web Services Description Language (WSDL) (as an example). WSDL file 36 contains a description of the available operations of cryptographic web service 12 and a suitable binding (i.e., the location of the web service). The WSDL file 36 may contain the location of web service 12 in the form of a universal resource locator (URL) (e.g., http://webservice.voltage.com/vibesoap) or any other suitable format. An example of a service description for a cryptographic web service 12 that supports encryption and decryption is a description of the functions "EncryptData" and "DecryptData."

Program 38 typically contains lines of code that make function calls to cryptographic web service 12. Illustrative code entries are shown in the program example of FIG. 2.

Figure 2:
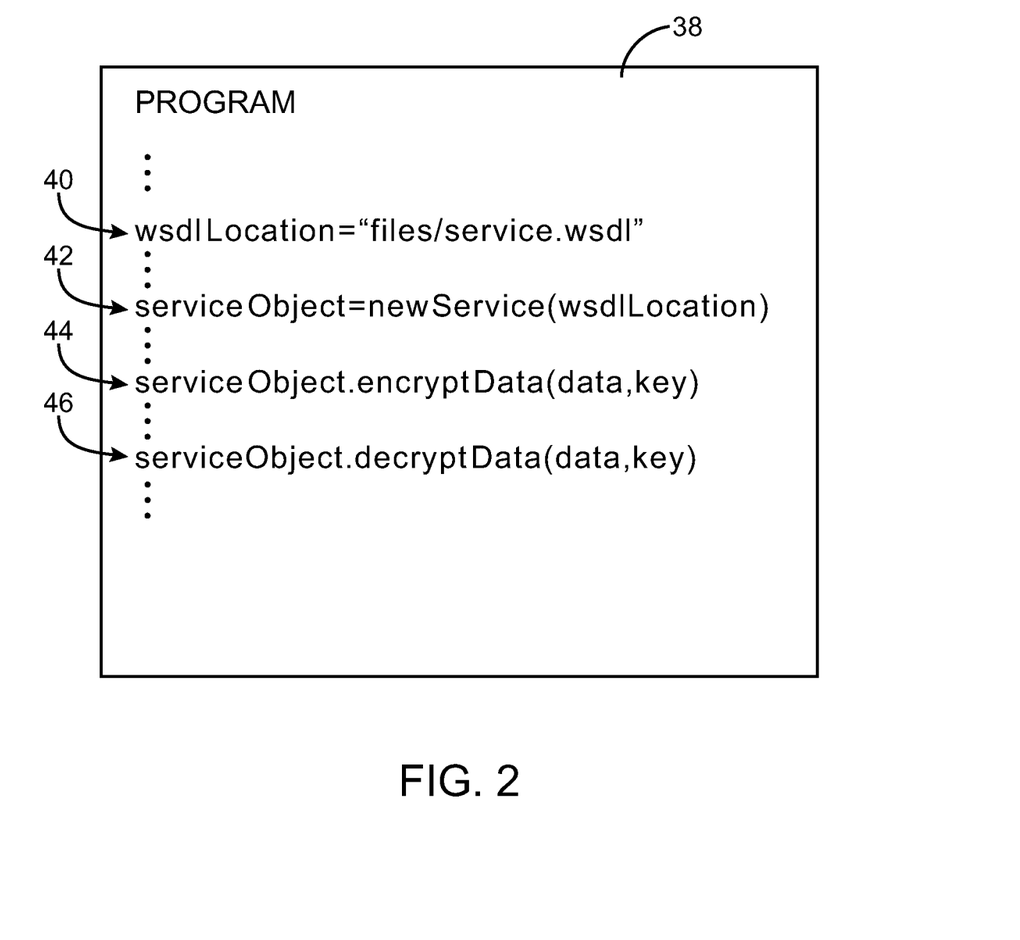
FIG. 2 is a diagram showing illustrative code that may be included in a program when using a web cryptographic service in accordance with the present invention.

As shown in FIG. 2, program 38 may contain a line of code 40 that identifies the location of WSDL file 36 (e.g., a universal resource locator or URL). The WSDL file 36 may be obtained from a web services registry (as an example) and may be stored locally or remotely. In the example of FIG. 2, WSDL file 36 is a local file that is stored in the file system of program computing equipment 32. When WSDL file 36 is stored remotely, code 40 may take the form of a remote http address. For example, the URL for a remotely located WSDL file 36 might be "http://service.example.com/service.wsdl".

Program 38 may use a statement such as statement 42 to create a local interface that allows program 36 to invoke remote functions offered by cryptographic web service 12 using a local function call.

Illustrative program statements 44 and 46 are examples of local function calls that may be included in program 38. In this example, the illustrative function calls are an encryption function call and a decryption function call. Illustrative arguments for the encrypt and decrypt functions are the parameters DATA (i.e., the information to be encrypted or decrypted) and KEY (i.e., the cryptographic encryption or decryption key). Depending on the type of cryptographic function involved, there may be more arguments, fewer arguments, or different arguments. Statements 44 and 46 are merely illustrative examples of local function calls.

If desired, a program may pass a parameter such as an identifier to the cryptographic web service that the cryptographic web service uses to obtain a corresponding key (i.e., a key different from the identifier itself), rather than passing a key as a parameter. As an example, a program may pass an identity to the cryptographic web service that is used to obtain an IBE private key from key server 28. As another example, an identifier may be used by the cryptographic web service to retrieve a PKI (public key infrastructure) public key or a PKI private key from a PKI directory.

An identifier may be passed to the cryptographic web service as a parameter that the cryptographic web service uses to identify a set of applicable rules. The set of rules may include rules on how to determine which cryptographic key to obtain, which encryption algorithm the cryptographic engine 14 should use, what strength of key should be used in engine 14, what type of information should be stored in log information 18 during logging operations, etc.

The parameters that are passed to the cryptographic web service may be analyzed by the cryptographic web service. The results of this type of analysis may be used in determining how to perform cryptographic functions with the cryptographic engine. As an example, payment card industry regulations may require that credit card numbers be encrypted with keys of a particular strength and that keys be refreshed according to a suitable interval (e.g., once per year). Cryptographic web service 12 may identify when the parameter DATA contains a credit card number. When a credit card number is identified, the cryptographic web service 12 may encrypt the parameter DATA with an encryption algorithm that is compliant with payment card industry regulations. Alternatively, a program may pass an identifier as a parameter that specifically designates that an accompanying parameter (e.g., parameter DATA) should be encrypted according to payment card industry regulations.

Figure 3:
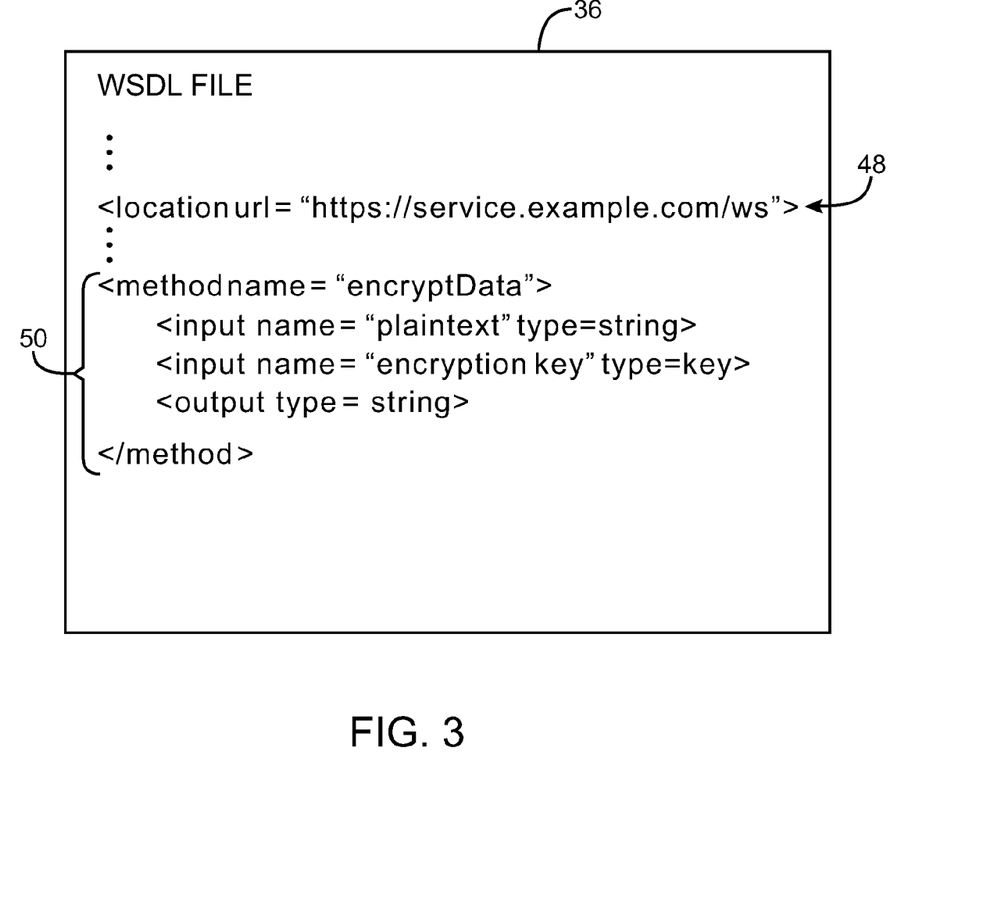
FIG. 3 is a diagram showing illustrative code in a web services description language (WSDL) file in accordance with the present invention.

An illustrative simplified WSDL file 36 is shown in FIG. 3. (WSDL specifications are available from the World Wide Web Consortium.) In general, any suitable web services description file may be used to describe the functions available through cryptographic web service 12. The use of a WSDL file is merely an example.

In the simplified example of FIG. 3, WSDL file 36 has a statement 48 that defines the protocol and address that are used in communicating with cryptographic web service 12. The protocol that is defined in this example (https) is sometimes referred to as http over SSL (secure sockets layer). This protocol is used for the communications link in communications network 26 between SOAP interface 22 in cryptographic web service 12 and SOAP interface 34 in program computing equipment 32. The address of the web service in the example of FIG. 3 is "service.example.com/ws".

The illustrative simplified WSDL file 36 of FIG. 3 also has statements 50. Statements 50 provide a definition of the illustrative cryptographic function "encrypt data." Statements such as statements 50 may be provided to define functions such as encryption functions, decryption functions, digital signature functions, digital signature verification functions, or any other suitable cryptographic functions. Statements 50 may include statements that define input and output data types, etc.

Figure 4:
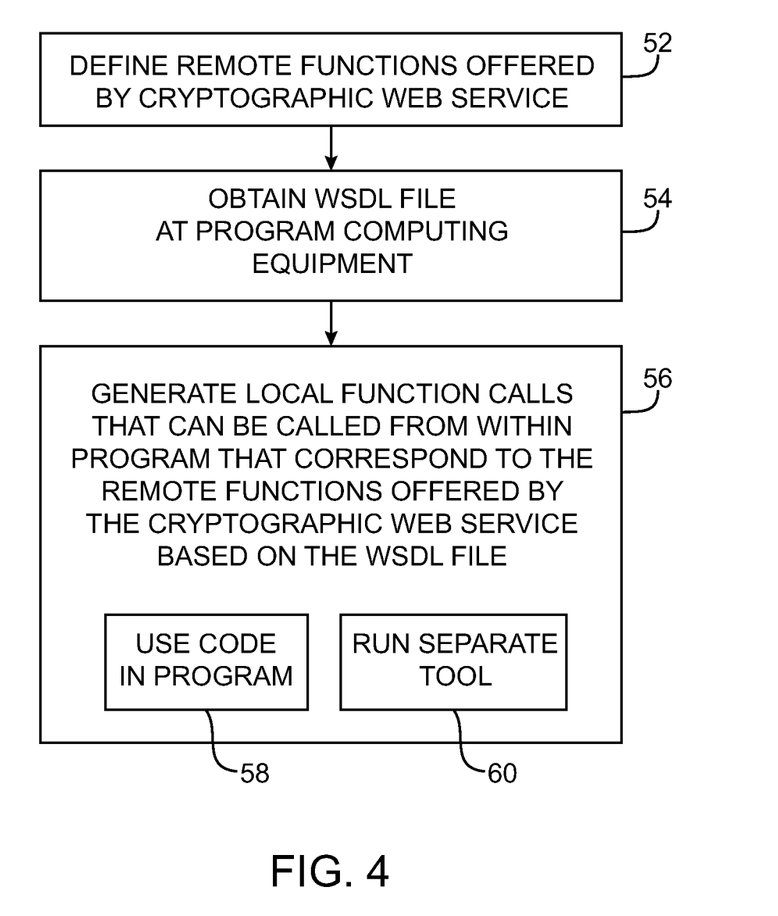
FIG. 4 is a flow chart of illustrative operations involved in setting up a cryptographic web service in accordance with the present invention.

Illustrative steps involved in setting up system 10 are shown in FIG. 4. At step 52, the entity deploying cryptographic web service 12 defines which remote functions will be offered by cryptographic web service. Examples of suitable functions that may be offered include IBE encryption, PKC encryption (traditional public-key encryption), symmetric key encryption, IBE decryption, PKC decryption, symmetric key decryption, digital signing services, signature verification services, etc. Once the functions that are offered have been defined, a web services description file such as WSDL file 36 of FIG. 1 may be created.

At step 54, program computing equipment 32 obtains WSDL file 36. Program computing equipment 32 may obtain the WSDL file from a web services registry on the internet, may obtain the WSDL file from local storage, or may obtain access to the WSDL file using any other suitable arrangement.

At step 56, local functions calls are generated that can be called from within program 38. These local function calls correspond to the remote functions that are offered by cryptographic web service 12 and are generated based on WSDL file 36. Local function calls can be generated at step 60 by running tools (e.g., WSDL2JAVA) or can be generated at step 58 by providing code in program 38 itself (e.g., using code such as the code of FIG. 3).

Figure 5:
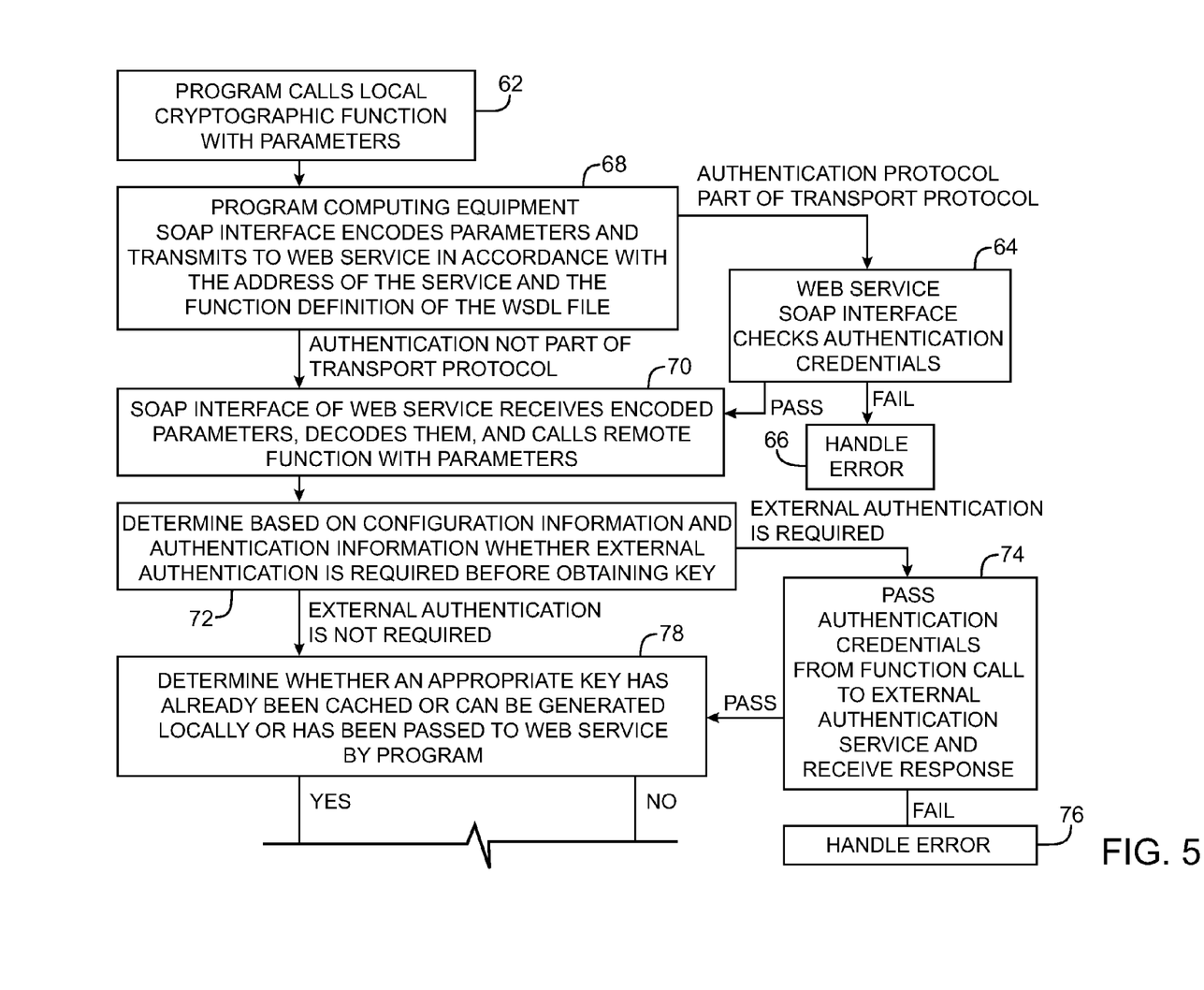
FIG. 5 is a flow chart of illustrative steps involved in using a cryptographic web service in accordance with the present invention.

Following the setup operations of FIG. 4, system 10 may be used to provide programs such as program 38 with cryptographic web services. Illustrative steps involved in providing programs such as program 38 with cryptographic web services are shown in FIG. 5. Not all of the steps of FIG. 5 need be implemented at any given time. For example, in some systems 10, only some of the operations of FIG. 5 will be performed. Although not all of the steps of FIG. 5 are necessarily performed in a given system arrangement, all of the steps of FIG. 5 are described herein for completeness.

At step 62, program 38 calls a local cryptographic function (e.g., a local cryptographic function is called from program 38), providing suitable parameters such as the arguments of the called function (e.g., suitable parameters are provided from program 38). The cryptographic function can be any suitable function, such as an IBE cryptographic function, a PKC cryptographic function such as an RSA function, a symmetric key cryptographic function, combinations of such functions, etc. Cryptographic functions can be implemented using cryptographic engine 14 (FIG. 1).

At step 68, program computing equipment SOAP interface 34 encodes the parameters that are being used in the local function call. The encoded parameters are transmitted by interface 34 to interface 22 over communications network 26 in accordance with the address of web service 12 and the function definition that are supplied in WSDL file 36.

In environments in which the transport protocol for the link between program computing equipment 32 and cryptographic web service 12 includes an authentication protocol, web service SOAP interface 22 can verify the authentication credentials that are associated with the authentication protocol at step 64.

An example of a transport protocol that includes an authentication protocol is the SSL protocol. Because authentication credentials are provided to cryptographic web service 12 by program computing equipment 32 as part of establishing an SSL link between equipment 32 and service 12, service 12 may check these authentication credentials at step 64 to verify whether program computing equipment 32 and program 38 are authorized to access the web service 12 and its associated called functions.

If it is determined at step 64 that program computing equipment 32 and program 38 are not authorized to access the web service, appropriate error handling actions can be taken at step 66. Examples of suitable error handling actions that can be taken include making an error entry in a log, notifying personnel associated with service 12 and/or program computing equipment 32 of the error, attempting to correct the error condition, etc.

If it is determined at step 64 that program computing equipment 32 and program 38 are authorized to access the web service, processing continues at step 70. In scenarios in which authentication is not part of the transport protocol, step 64 is bypassed and processing proceeds directly from step 68 to step 70.

At step 70, simple object access protocol interface 22 receives the encoded parameters that were transmitted at step 68 and decodes them. The simple object access protocol interface 22 then calls the remote function that corresponds to the local function called at step 62 using the decoded parameters as arguments.

At step 72, web service 12 uses configuration information 20 and the program's authentication credentials to determine whether external authentication is required before web service 12 obtains a key as part of providing the called function to the program 38. External authentication can be performed using, for example, a LDAP (Lightweight Directory Access Protocol) server or a RADIUS server. Policy information in configuration information 20 may dictate that certain types of function calls require external authentication. For example, external authentication may be required for decryption operations, but not encryption operations. As another example, external authentication may be required for certain types of calling programs 38 or when particular types of programs call particular types of functions.

If it is determined at step 72 that external authentication is required, the web service 12 passes authentication credentials that have been received as part of the function call to an external authentication service 30 and receives a response. If authentication at step 74 fails, this error can be handled at step 76 (e.g., by notification, attempts at error correction, etc.). If authentication at step 74 succeeds, or if external authentication was not required, at step 78 web service 12 determines whether an appropriate key has already been cached in cache 16, whether an appropriate key can be generated locally, or whether an appropriate key has been passed to web service 12 by program 38. A key may already have been cached in cache 16 following an earlier key request. Keys can also sometimes be generated locally (e.g., using key generation algorithms). For example, it is generally not necessary to retrieve an IBE public key from a key server for supporting IBE encryption operations. Rather, IBE encryption operations can be performed using identity-based information (as an example) and IBE parameters (which may be locally available). Keys may also be passed as an argument to the called function. In these situations, it is not necessary to obtain a key from key server 28.

If it is determined at step 78 that an appropriate key has not already been cached, cannot be generated locally, and has not been passed to service 12 by program 38, web service 12 obtains an appropriate key from key server 28 at step 80. In obtaining the key from key server 28, web server 12 uses the authentication credentials that were received as part of the function call. The key that is obtained can be cached in cache 16 for future use, if desired. If web service 12 is unable to obtain the key, web service 12 can take appropriate error handling actions at step 82.

After obtaining a cryptographic key from key server 28 at step 80 or after obtaining an appropriate cryptographic key at step 78 (e.g., from cache 16, by generating an appropriate key locally, or by receiving an appropriate key as part of the function call), the web service uses cryptographic engine 14 at step 84 to perform the cryptographic functions associated with the called function (e.g., encryption or decryption). In performing the cryptographic function, web service 12 uses the parameters that SOAP interface 34 passed from program 38 to SOAP interface 22 and uses the cryptographic key that has been obtained.

During step 84, cryptographic web service 12 may analyze parameters that have been passed to cryptographic web service (e.g., parameters such as parameter DATA). The results of the analysis may be used in determining how to perform cryptographic functions with cryptographic engine 14. As an example, payment card industry regulations may require that credit card numbers be encrypted with keys of a particular strength and that keys be refreshed according to a suitable interval (e.g., once per year). Cryptographic web service 12 may identify situations in which a parameter that has been passed (e.g., parameter DATA) contains a credit card number. When a credit card number is recognized in parameter DATA by the cryptographic web service 12, the cryptographic web service 12 may request and obtain a key of an appropriate strength from key server 28 and may encrypt parameter DATA with an encryption algorithm that is compliant with payment card industry regulations (e.g., using a key of an appropriate strength and other suitable settings). Alternatively, program 38 may use interface 34 to pass an identifier as a parameter that specifically designates that an accompanying parameter (e.g., parameter DATA) should be encrypted according to payment card industry regulations. In this situation, cryptographic web service 12 will also use an encryption algorithm that is compliant with payment card industry regulations in encrypting DATA.

At step 86, cryptographic web service 12 verifies whether the calling program 38 is authorized to perform the specific cryptographic operation that is associated with the called function. The determination of step 86 may be made based on the authentication credentials of the program and stored configuration information 20. As an example, an identifier in the authentication credentials may indicate that program 38 is a bank statement generation program. Policy information in configuration information 20 may include a rule that allows all bank statement generation programs to freely use the encryption operations of encryption engine 14. In this situation, the program 38 will be authorized to proceed. If desired, the operations of step 86 may be performed before the operations of step 84.

Selective authorization techniques such as these may be particularly advantageous in symmetric key systems. In symmetric key systems, encryption keys and decryption keys are the same. It may therefore be desirable to provide certain programs only with the ability to perform decryption operations or only with the ability to perform encryption operations. By comparing each program's authentication credentials or other such information to policies maintained in configuration information 20, web service 12 can be configured so that only programs using certain authentication credentials will be allowed to encrypt data or will be allowed to decrypt data. As an example, the configuration information 20 might contain a list of programs or types of program and corresponding rights for using different cryptographic functions (e.g., programtype1: allow encrypt.decrypt; programtype2: allow encrypt, etc.).

If the program is not authorized to perform the operations associated with the called function, the web service 12 can take suitable error handling actions at step 88.

If the program is authorized to perform the operations associated with the called function, the results of the operations performed at step 84 may be provided to program 38. Results may be returned to program 38 by using simple object access protocol interface 22 to send the results to simple object access protocol interface 34 over communications network 26.

If desired, the amount of cryptographic functionality that is granted to a requesting program can depend on the authorization level of that program. For example, a requesting program may be granted as much cryptographic functionality as is possible, given the authorization level of the program. Alternatively, a requesting program may provide service 12 with information on a desired level of functionality for cryptographic engine 14. After service 12 determines what level of authorization is associated with the requesting program, service 12 can provide the requesting program with an appropriate level of remote cryptographic functionality.

Information on the authorization levels of various programs can be maintained at cryptographic web service 12. For example, configuration information 20 may include information on the levels of cryptographic functionality that are permissible for different programs. This information may be stored in any suitable format. As an example, information on the identity of various programs and the types of services that these programs are allowed to access may be stored in one or more tables in configuration information 20.

Figure 6:
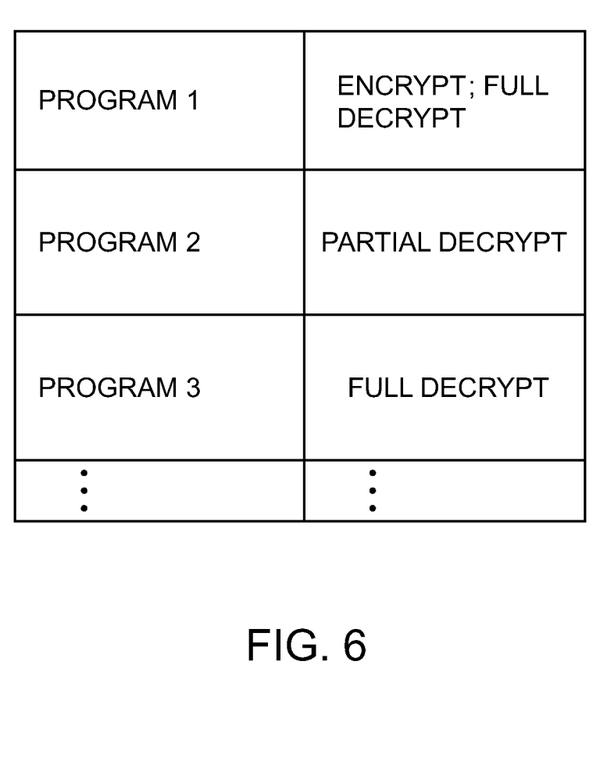
FIG. 6 shows an illustrative table of authorization level information that may be used to determine which levels of cryptographic function operations are authorized for various calling programs in accordance with the present invention.

An illustrative table that may be used to specify which levels of cryptographic functionality are allowed for various different programs is shown in FIG. 6. In the example of FIG. 6, the table of authorization level information includes a first column in which the name or other identifier of various calling programs is listed. The table also includes a second column of entries that specify the highest permissible level of cryptographic functionality for each of one or more cryptographic functions. For example, cryptographic engine 14 of FIG. 1 may be used to implement a remote encryption function (ENCRYPT) and a remote decryption function (DECRYPT). The entries of the second column of the FIG. 6 table may specify whether or not each program is able to use these functions. In the FIG. 6 example, program1 is authorized to use ENCRYPT, but program2 and program3 are not authorized to use ENCRYPT. Access to partial levels of cryptographic functionality may be allowed. For example, program2 may be only allowed to access part of the functionality of the DECRYPT function (e.g., sufficient functionality to decrypt the first half of a string but not a second half or sufficient functionality to decrypt a name but not a serial number, etc.). Program1 and program3, on the other hand, may be permitted to use all of the DECRYPT functionality that is provided by cryptographic engine 14 (as an example).

The example of FIG. 6 is merely illustrative. Any suitable database structures may be used to maintain information on the levels of authorization for different calling programs if desired. Moreover, access to cryptographic functionality may be provided with any suitable level of granularity. For example, with one scheme each program may be permitted to have either (1) no rights; (2) partial rights; or (3) full rights. Program rights may also be divided using a four-level system, a five-level system, or multilevel system with more than five different functionality levels.

In environments in which cryptographic web service 12 provides different levels of access to different programs, service 12 can automatically grant each program the maximum level of functionality for the remote cryptographic function to which each requesting program is entitled. Alternatively, calling programs can specify the amount of cryptographic functionality that is desired when requesting that the web service perform a particular remote cryptographic function. If the calling program is authorized, the web service can perform the desired cryptographic operation by running cryptographic engine 14 with the appropriate level of functionality.

Figure 7:
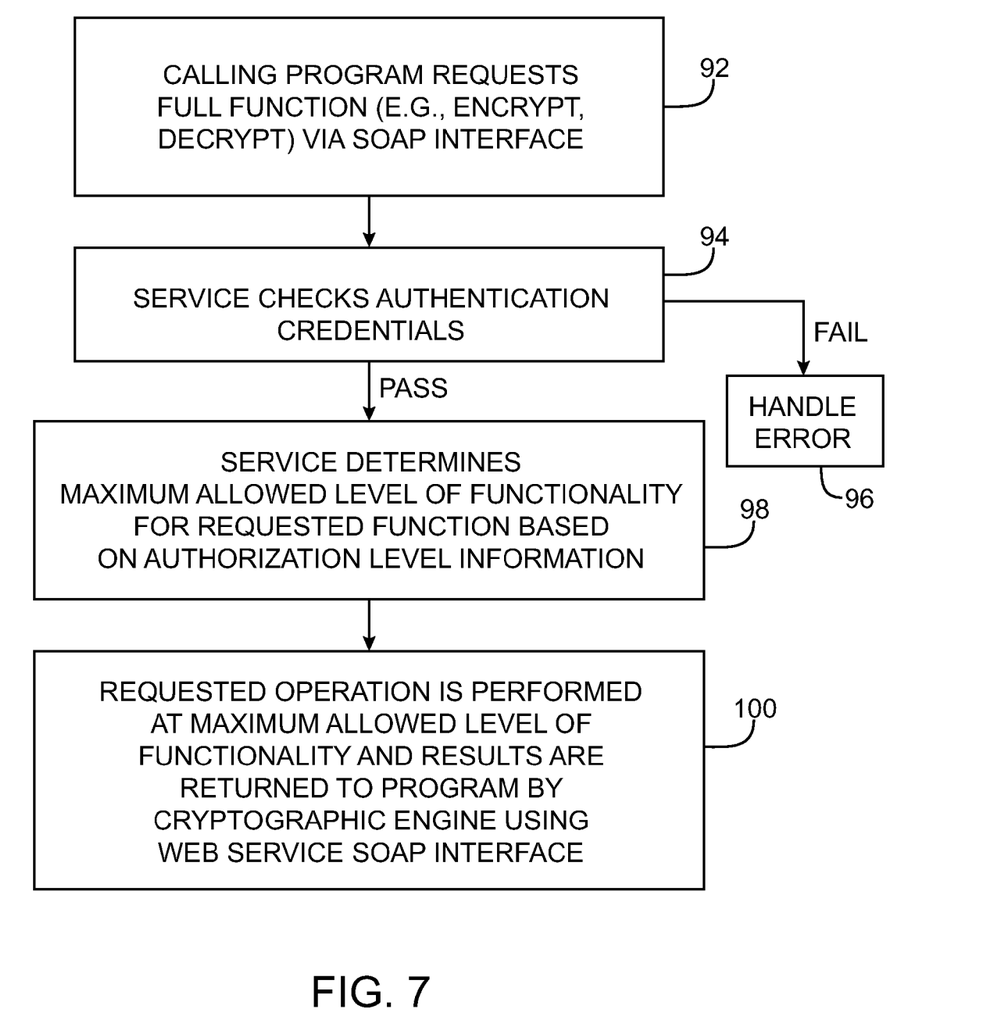
FIG. 7 is a flow chart of illustrative steps involved in satisfying a remote cryptographic function request when a program requests execution of the cryptographic function with a maximum permissible level of functionality in accordance with the invention.

Illustrative steps involved in using service 12 to perform a cryptographic function in an environment in which different calling programs are provided with different levels of cryptographic engine functionality depending on their authorization level and in which each authorized function is granted its maximum permissible level of functionality are shown in FIG. 7.

At step 92, program 38 calls a cryptographic function. As described in connection with FIG. 5, program 38 may call a local cryptographic function on equipment 32. SOAP interface 38 may transmit the request for the cryptographic function to service 12, which processes the request using SOAP interface 22 so that a corresponding remote cryptographic function may be run at web service 12.

As illustrated by step 94, service 12 may check the authentication credentials of the calling program. Authentication may be performed as part of a transport protocol, using an external authentication scheme, by checking the calling program's credentials against authentication information 24, or using any other suitable approach. If the calling program is not successfully authenticated, appropriate error handling actions can be taken at step 96 (e.g., by making an error entry in a log, notifying personnel associated with service 12 and/or program computing equipment 32 of the error, attempting to correct the error condition, etc.).

If it is determined at step 94 that program computing equipment 32 and program 38 are authorized to access the web service, service 12 may, at step 98, determine the maximum permissible amount of functionality for the called cryptographic function that is associated with program 38. For example, if program 38 is "program2" in the example of FIG. 6, program 38 would have no allowed ENCRYPT capabilities and would have partial DECRYPT capabilities. If program 38 is "program1" of FIG. 6, program 38 would have permission to direct service 12 to use the full ENCRYPT functionality and the full DECRYPT functionality of cryptographic engine 14. If program 38 is "program3" in the FIG. 6 example, program 38 would be authorized to use all of the DECRYPT functionality of engine 14 and none of its ENCRYPT functionality.

The determination of step 98 may, for example, be performed by using the identity of the calling program to perform a table look-up operation on a table of authorization level information in configuration information 20 (e.g., using a table of the type shown in FIG. 6). The operations of step 94 that are associated with checking the authentication credentials of the calling program and the operations of step 98 that are associated with determining the maximum allowed level of functionality for the cryptographic operation that a given calling program is requesting may be performed during the same step or during two or more different steps.

After determining what level of remote cryptographic functionality to provide for the calling program, web service 12 may, at step 100, perform the requested operation using cryptographic engine 14. The results of the requested operation may be returned to the calling program using SOAP interface 22, communications network 26, and SOAP interface 34.

Figure 8:
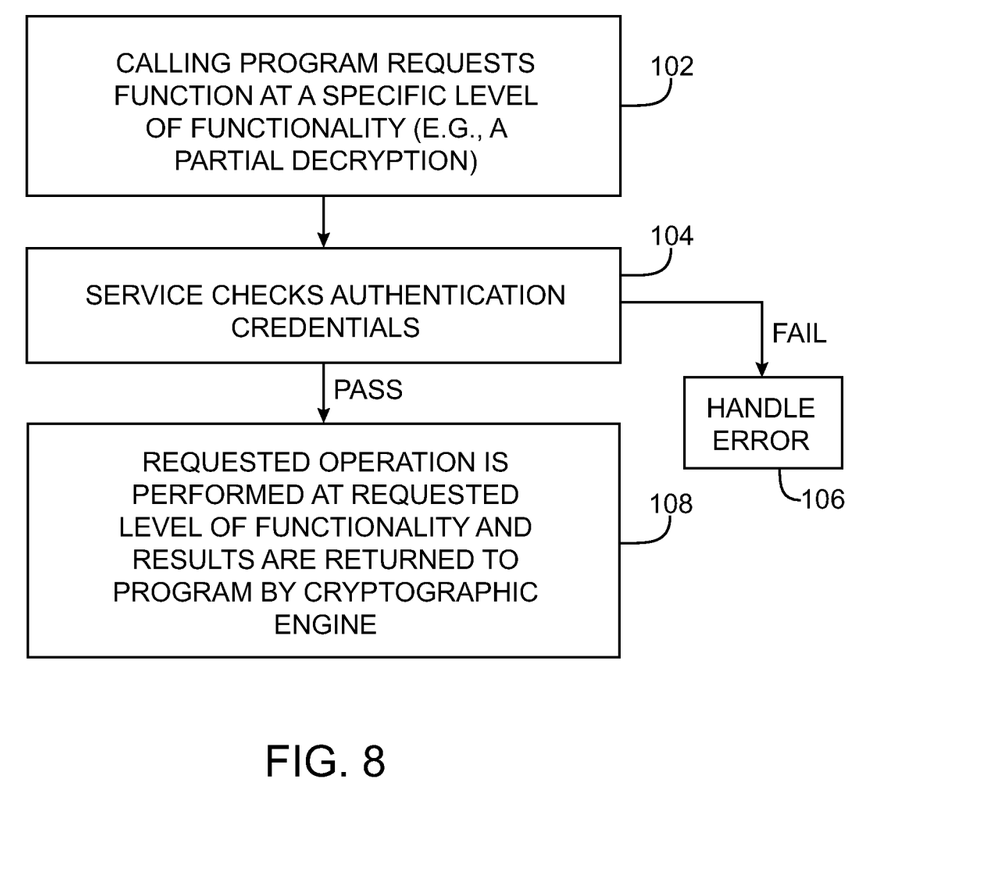
FIG. 8 is a flow chart of illustrative steps involved in satisfying a remote cryptographic function request when a program requests execution of the cryptographic function with a desired level of functionality in accordance with the invention.

FIG. 8 is a flow chart of illustrative steps involved in satisfying a cryptographic function request when a program requests execution of a remote cryptographic function with a desired level of functionality in accordance with the invention.

At step 102, program 38 may call a cryptographic function such as an encryption or decryption function. As described in connection with FIG. 5, program 38 may call a local cryptographic function on equipment 32. SOAP interface 38 may transmit the request for the cryptographic function to service 12, which may process the request using SOAP interface 22. The request for the cryptographic function (or related transmissions) may include information specifying a desired level of cryptographic function functionality. For example, the request may ask service 12 to perform a full DECRYPT operation or may ask service 12 to perform a partial DECRYPT operation (as examples).

As illustrated by step 104, service 12 may check the authentication credentials of the calling program. Authentication may be performed as part of a transport protocol, using an external authentication scheme, by checking the calling program's credentials against authentication information 24, or using any other suitable approach. If the calling program is not successfully authenticated, appropriate error handling actions can be taken at step 106.

As part of the authorization operations of step 104 or during other suitable operations, cryptographic web service 12 may determine whether the calling program is authorized to have the called remote cryptographic function performed with the desired level of functionality. In making this determination, cryptographic web service 12 may consult configuration information 20 (e.g., authorization level information in the form of a table of the type shown in FIG. 6, etc.). For example, if the calling program has requested that a full DECRYPT function be performed, cryptographic web service 12 may determine whether the calling program is authorized to perform DECRYPT functions at the "full" level or is only authorized to perform DECRYPT functions at a "partial" level. If the calling program is authorized to have the requested function performed at the desired level of functionality, cryptographic engine 14 may be used to perform the function with that level of functionality. The results from this cryptographic operation may be returned to the calling program using SOAP interface 22, communications network 26, and SOAP interface 34 (step 108).

The foregoing is merely illustrative of the principles of this invention and various modifications can be made by those skilled in the art without departing from the scope and spirit of the invention.

What is claimed is:

1. A method in which a program uses a cryptographic web service remotely over a communications network, comprising:

at program computing equipment on which the program is implemented, calling a local cryptographic function from the program;

in response to calling the local cryptographic function, calling a remote cryptographic function at the cryptographic web service that corresponds to the called local cryptographic function by sending information from a web services interface at the program computing equipment to a web services interface at the cryptographic web service over the communications network based on an address of the cryptographic web service and a function definition for the called remote cryptographic function that are supplied to the program computing equipment from a web services registry in a web services description language file, wherein the information includes at least one data parameter;

at the cryptographic web service, determining based on configuration information and authentication information stored within the cryptographic web service, whether external authentication is required before obtaining a key locally;

in response to determining that external authentication is required, before obtaining the key locally, passing authentication credentials of the program to an external authentication service for the external authentication;

after passing the authentication credentials of the program to the external authentication service for external authentication, receiving a response from the external authentication service to determine a status of the external authentication;

in response to determining the status of the external authentication as failing external authentication, generating an error entry in a log within the cryptographic web service;

at the cryptographic web service, obtaining the key locally in response to determining that external authentication is not required;

at the cryptographic web service, producing results for the called remote cryptographic function using a cryptographic engine, wherein the results are produced by the cryptographic engine using the locally obtained key, wherein the remote cryptographic function comprises encrypting the at least one data parameter to produce encrypted data; and at the program computing equipment, receiving the results for the called remote cryptographic function from the cryptographic web service, wherein the results include the encrypted data.

2. The method defined in claim 1 further comprising:

at the program computing equipment on which the program is implemented, generating parameters for the local cryptographic function, wherein the parameters include the at least one data parameter.

3. The method defined in claim 1 wherein the web services interface at the program computing equipment comprises a simple object access protocol interface, the method further comprising:

at the program computing equipment on which the program is implemented, generating parameters for the local cryptographic function, wherein the parameters include the at least one data parameter; and encoding the parameters with the simple object access protocol interface on the program computing equipment.

4. The method defined in claim 1 wherein the web services interface at the program computing equipment comprises a simple object access protocol interface and wherein the web services interface at the cryptographic web service comprises a simple object access protocol interface, the method further comprising:

at the program computing equipment on which the program is implemented, generating parameters for the local cryptographic function, wherein the parameters include the at least one data parameter;

encoding the parameters with the simple object access protocol interface on the program computing equipment;

receiving the encoded parameters with the simple object access protocol interface at the cryptographic web service; and decoding the encoded parameters with the simple object access protocol interface at the cryptographic web service.

5. The method defined in claim 1 wherein the web services interface at the program computing equipment comprises a simple object access protocol interface and wherein the web services interface at the cryptographic web service comprises a simple object access protocol interface, the method further comprising:

at the program computing equipment on which the program is implemented, generating parameters for the local cryptographic function, wherein the parameters include the at least one data parameter;

encoding the parameters with the simple object access protocol interface on the program computing equipment;

receiving the encoded parameters with the simple object access protocol interface at the cryptographic web service;

decoding the encoded parameters with the simple object access protocol interface at the cryptographic web service; and at the cryptographic web service, calling the remote cryptographic function with the decoded parameters.

6. A method in which a program uses a cryptographic web service remotely over a communications network, comprising:

at program computing equipment on which the program is implemented, calling a local cryptographic function from the program;

in response to calling the local cryptographic function, calling a remote cryptographic function at the cryptographic web service that corresponds to the called local cryptographic function by sending information from a web services interface at the program computing equipment to a web services interface at the cryptographic web service over the communications network, wherein the information includes at least one data parameter, the web services interface at the program computing equipment comprises a simple object access protocol interface, and the web services interface at the cryptographic web service comprises a simple object access protocol interface;

at the cryptographic web service, determining based on configuration information and authentication information stored within the cryptographic web service, whether external authentication is required before obtaining a key locally;

at the cryptographic web service, obtaining the key locally in response to determining that external authentication is not required;

at the cryptographic web service, determining whether the locally obtained key is stored at a key cache within the cryptographic web service;

at the cryptographic web service, in response to determining that the locally obtained key is not stored at the key cache within the cryptographic web service, storing the locally obtained key at the key cache within the cryptographic web service;

at the cryptographic web service, producing results for the called remote cryptographic function using a cryptographic engine, wherein the results are produced by the cryptographic engine using the locally obtained key, wherein the remote cryptographic function comprises encrypting the at least one data parameter to produce encrypted data;

at the program computing equipment, receiving the results for the called remote cryptographic function from the cryptographic web service, wherein the results include the encrypted data;

providing parameters for the local cryptographic function from the program, wherein the parameters include the at least one data parameter;

encoding the parameters with the simple object access protocol interface on the program computing equipment;

transmitting the encoded parameters to the simple object access protocol interface at the cryptographic web service from the simple object access protocol interface at the program computing equipment over the communications network in accordance with an address of the cryptographic web service and a function definition for the remote cryptographic function that are supplied in a web services description language file;

at the cryptographic web service, verifying authentication credentials of the program to determine whether the program is authorized to access the cryptographic web service, wherein the authentication credentials of the program comprise identification information of the program;

at the cryptographic web service, in response to determining that the program is not authorized to access the cryptographic web service, generating a first error entry in a log within the cryptographic web service;

receiving the encoded parameters with the simple object access protocol interface at the cryptographic web service;

decoding the encoded parameters with the simple object access protocol interface at the cryptographic web service;

at the cryptographic web service, calling the remote cryptographic function with the decoded parameters;

in response to calling the remote cryptographic function with the decoded parameters at the cryptographic web service, performing cryptographic operations with a cryptographic engine at the cryptographic web service using the decoded parameters, wherein the decoded parameters include input data for the cryptographic engine;

in response to determining that the external authentication is required, before obtaining the key locally, passing the authentication credentials of the program to an external authentication service for the external authentication;

after passing the authentication credentials of the program to the external authentication service for external authentication, receiving a response from the external authentication service to determine a status of the external authentication;

in response to determining the status of the external authentication as a failed external authentication, generating a second error entry in the log within the cryptographic web service;

at the cryptographic web service, verifying whether the program is authorized to perform an encryption operation based on authentication credentials of the program and stored configuration information within the cryptographic web service, wherein the authentication credentials of the program comprise identification information of the program, and wherein the stored configuration information within the cryptographic web service comprises information on types of authentication credentials that are required from the program; and at the cryptographic web service, in response to verifying that the program is not authorized to perform the encryption operation, generating a third error entry in the log within the cryptographic web service.

7. The method defined in claim 1 further comprising:

at the cryptographic web service, from authorization level information at the cryptographic web service, determining, for the program, a maximum allowed level of cryptographic functionality to be performed by the remote cryptographic function; and at the cryptographic web service, performing the called remote cryptographic function from the determined maximum allowed level of cryptographic functionality.

8. The method defined in claim 1 further comprising:

at the cryptographic web service, from the program, requesting a desired level of cryptographic functionality to be performed by the remote cryptographic function;

at the cryptographic web service, from authorization level information at the cryptographic web service, determining whether the program is authorized to have the cryptographic web service perform the remote cryptographic function with the desired level of cryptographic functionality; and at the cryptographic web service, if it is determined from the authorization level information at the cryptographic web service that the program is authorized to have the cryptographic web service perform the remote cryptographic function with the desired level of cryptographic functionality, performing the remote cryptographic function with the desired level of cryptographic functionality.

9. The method defined in claim 1 further comprising:

at the cryptographic web service, from the program, requesting a desired level of cryptographic functionality to be performed by the remote cryptographic function;

at the cryptographic web service, from authorization level information at the cryptographic web service, determining whether the program is authorized to have the cryptographic web service perform the remote cryptographic function with the desired level of cryptographic functionality; and at the cryptographic web service, if it is determined from the authorization level information at the cryptographic web service that the program is authorized to have the cryptographic web service perform the remote cryptographic function with the desired level of cryptographic functionality, performing the remote cryptographic function with the desired level of cryptographic functionality.

* * * * *